(No Model.)

C. W. HUNTLEY.
HAY STACKER.

No. 355,651. Patented Jan. 4, 1887.

WITNESSES:
C. Neveux
C. Sedgwick

INVENTOR:
C. W. Huntley
BY Munn & Co.
ATTORNEYS.

N. PETERS, Photo-Lithographer, Washington, D. C.

UNITED STATES PATENT OFFICE.

CLARK W. HUNTLEY, OF CHARITON, IOWA.

HAY-STACKER.

SPECIFICATION forming part of Letters Patent No. 355,651, dated January 4, 1887.

Application filed April 8, 1886. Serial No. 198,202. (No model.)

*To all whom it may concern:*

Be it known that I, CLARK W. HUNTLEY, of Chariton, in the county of Lucas and State of Iowa, have invented a new and Improved Hay-Stacker, of which the following is a full, clear, and exact description.

The invention consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
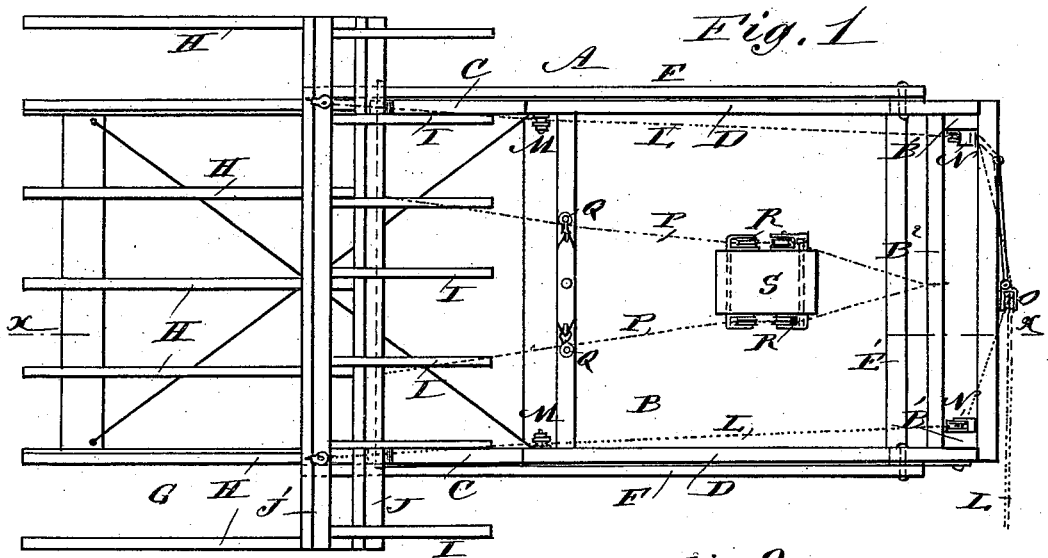
Figure 2:
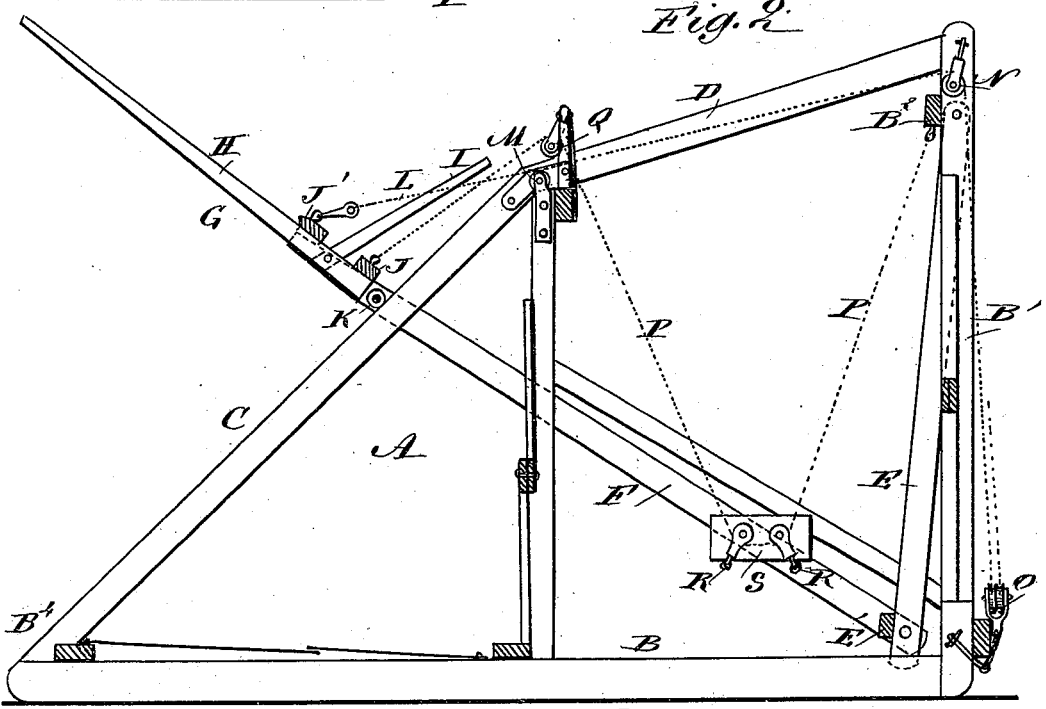
Figure 3:
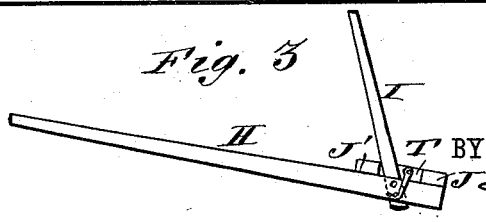

Figure 1 is a plan view of a machine embodying my improvements. Fig. 2 is a sectional side elevation of the same on the line $x$ $x$ of Fig. 1, and Fig. 3 is a detail view showing the movable prongs of the fork in a reversed position.

The frame B of the hay-stacker A is of suitable construction, and is provided with the inclined beams C C and D D. On each of the rear uprights, B', of the frame B is fulcrumed an arm, E, pivotally connected with an arm, F, to the front ends of which arms F is attached the fork G, having stationary prongs H, and reversible prongs I, pivoted to the prongs H, and resting on either the cross-bar J or the cross-bar J', both of which cross-bars are secured to the prongs H. A cross-bar, E', connects the arms E at each side of the frame B. A friction-roller, K, mounted at the inner side of each arm F, rests and travels on the inclined beams C.

To the cross-bar J' are fastened in any suitable manner the ropes L, which pass over pulleys M M and N N, and down around pulleys in the double sheave O, attached near the ground to the main frame B. Two ropes, P, are attached to the cross-beam J, pass over the pulleys Q, and down around the pulleys R, attached in any suitable manner to the balancing-box S, and then up to the cross-beam B² of the uprights B', to which the ropes are fastened.

The operation is as follows: When the fork G is to be loaded, it rests on the ground near the front end, B⁴, of the main frame B, and as soon as said fork has been loaded with hay the ropes L are pulled, either by hand or by the use of horse-power, so that the fork G is forced to travel up the inclined beams C by the aid of the friction-rollers K. During this upward movement of the fork G the arms F are caused to move toward the rear end of the frame B, swinging with the arms E, pivoted to the uprights B'. At the same time that the friction-rollers K reach the upper ends of the inclined beams C the cross-bar E' of the arms E rests against the uprights B', and as the pulling of the ropes L is continued the fork G swings with the arms F to the rear end of the frame B, the pivotal connection between the arms F and E being the fulcrum. As soon as the fork G has reached the rear end of the frame it discharges its load on the stack which is being built.

The balancing-box S is so weighted as to allow the fork to descend to its first or normal position on the ground as soon as the hay is discharged from the same.

In topping the stack it is desirable to have the last forkful of hay rest on the prongs H and I until it is needed by the operator building the stack. For this purpose the prongs I are made reversible, as shown in Fig. 3, by inserting a cross-bar, T, between the prongs I and the cross-bar J, and fastening the cross-bar T to the fork G in any suitable manner. The prongs I then rest on the cross-bar J', and the hay is prevented from falling out of the fork when it is in the elevated position, and by letting the arms E and F swing forward to the center posts the fork G can be carried back until the prongs I rest against the stack.

Having thus fully described my invention, I claim as new and desire to secure by Letters Patent—

1. A hay-stacker comprising the main frame B, having uprights B' at its rear end, the bars E, pivoted at their upper ends to the said uprights, the forwardly-extending arms F, pivoted at their rear ends to the lower ends of said bars E, the fork G at the forward ends of the arms F, the cross-bar or stop E' at the lower ends of bars E, operating-ropes, and suitable pulleys therefor, substantially as set forth.

2. In a hay-stacker, the combination of a main frame having inclined beams, ropes attached to the fork, pulleys, and a double sheave for said ropes on the main frame, a fork having arms and friction-rollers thereon, and swinging arms connected by a cross-piece and pivoted to the arms of the fork and to the main frame, substantially as set forth.

3. In a hay-stacker, the combination of a frame having inclined beams, a fork attached to arms having friction-rollers, arms provided with a cross-piece and pivoted to the fork-arms and to the main frame, a balancing-box provided with pulleys, and ropes passing under the balancing-box pulleys and attached to the fork and to the main frame, substantially as shown and described.

4. In a hay-stacker, the combination of the fork G, having prongs H, cross-pieces J and J', and the prongs I, pivoted to the prongs H, with the cross-bar T, detachably fastened to the fork G, substantially as herein shown and described.

CLARK W. HUNTLEY.

Witnesses:
F. B. CURTIS,
F. R. CROCKER.